United States Patent [19]
Pavlis

[11] Patent Number: 5,814,227
[45] Date of Patent: Sep. 29, 1998

[54] WATER TREATMENT ARRANGEMENT

[75] Inventor: Donald W. Pavlis, Riverside, Calif.

[73] Assignee: Glendon Family Trust, Riverside, Calif.

[21] Appl. No.: 825,438

[22] Filed: Mar. 28, 1997

Related U.S. Application Data

[63] Continuation of Ser. No. 534,619, Sep. 27, 1995, abandoned.

[51] Int. Cl.⁶ ...................................................... C02F 1/70
[52] U.S. Cl. .......................... 210/696; 210/763; 210/764; 210/198.1; 210/205
[58] Field of Search ................................ 210/198.1, 696, 210/764, 763, 205

[56] References Cited

U.S. PATENT DOCUMENTS

| | | | |
|---|---|---|---|
| 3,974,071 | 8/1976 | Dunn et al. ................................ | 210/57 |
| 4,606,828 | 8/1986 | Wells ...................................... | 210/696 |
| 5,197,446 | 3/1993 | Daywalt et al. ......................... | 123/538 |
| 5,204,006 | 4/1993 | Santoli .................................... | 210/696 |

*Primary Examiner*—Neil McCarthy

[57] ABSTRACT

A water treatment arrangement is provided in which water is given a reduced pH by a first catalyst and then is caused to flow over a second catalyst that changes nitrates, nitrites, phosphates, salts and other contaminants from reactive to nonreactive form. The first catalyst may be palladium and the second catalyst an alloy containing copper, tin, nickel and zinc. The first catalyst prevents precipitants from coating the second catalyst and also increases the supply of oxygen in the water. Preferably, a third catalyst, also palladium, is included downstream of the second catalyst. The first and third catalysts include longitudinal vanes having louvers to present a large surface area and create turbulence. The second catalyst is a tubular assembly with ribs and grooves also to create turbulence and removal of the stagnant boundary layer from the catalyst's surface. The catalysts are in an end-to-end abutting relationship within a housing of corrosion-resistant material.

23 Claims, 3 Drawing Sheets

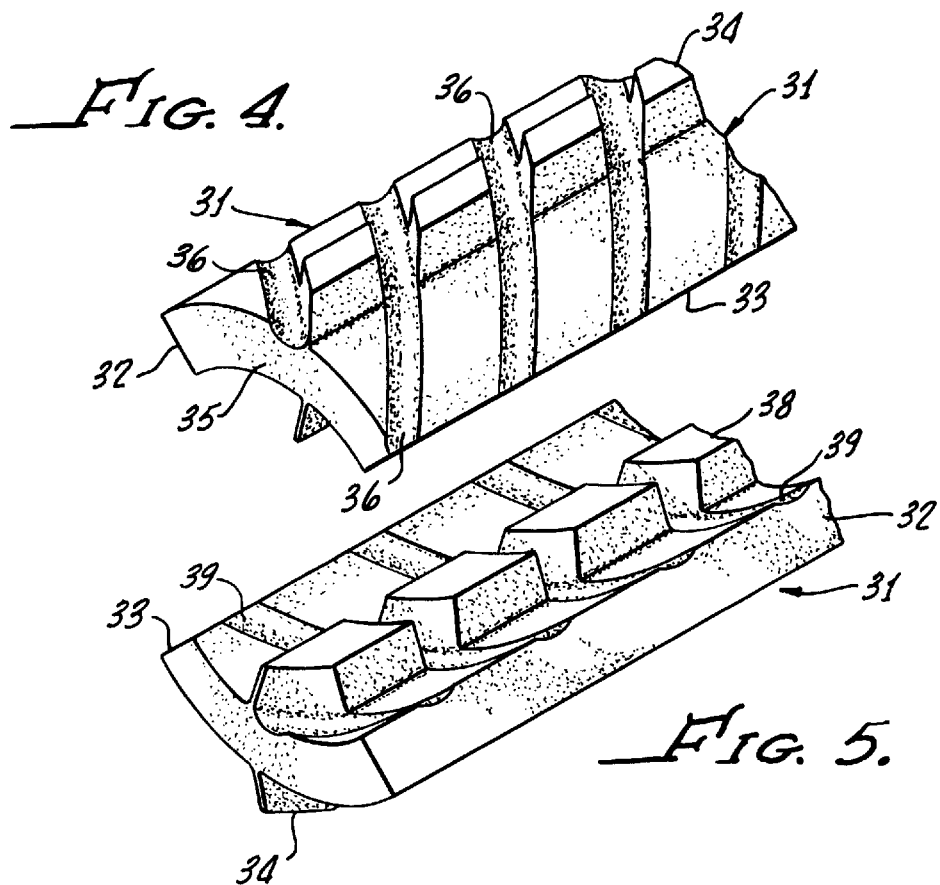
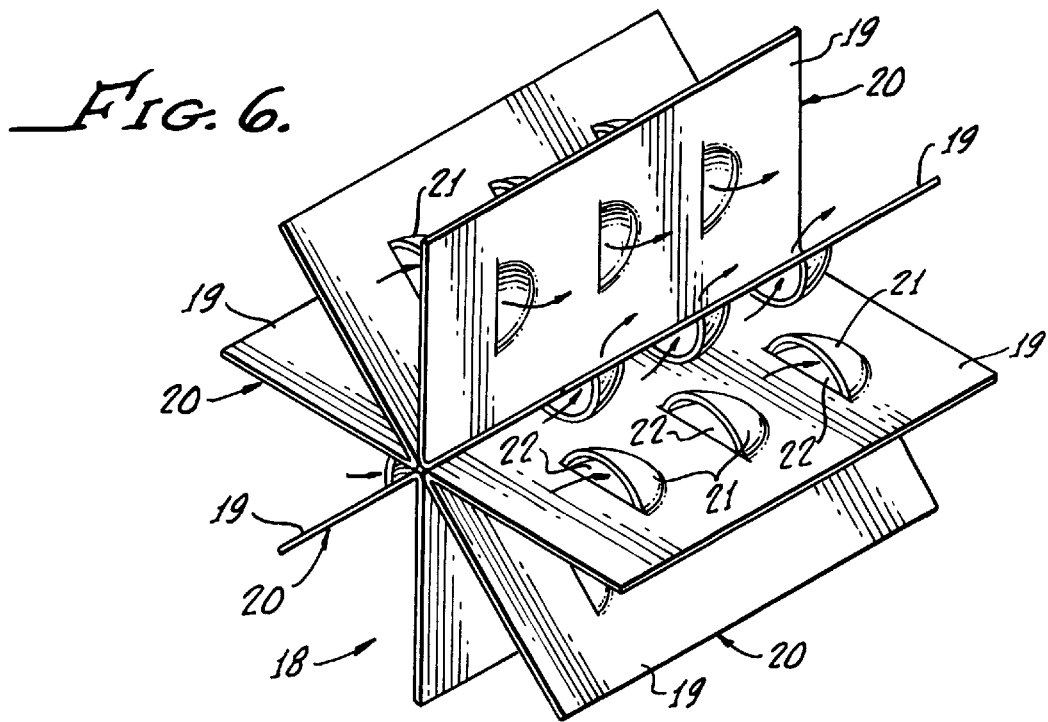

WATER TREATMENT ARRANGEMENT

This application is a continuation of application Ser. No. 08/534,619, filed Sep. 27, 1995, now abandoned.

FIELD OF THE INVENTION

This invention pertains to a device and method for the treatment and conservation of water for a variety of purposes.

BACKGROUND OF THE INVENTION

Water usage is critical for purposes ranging from agriculture to zoology, yet water systems historically have been fraught with problems. For example, irrigation water often has high salinity which can cause severe damage to crops that receive it. Such water typically has high concentrations of calcium carbonate and other calcareous salts, causing hardness of the water. One effect is to cause compaction of the soil, preventing penetration by the water and again greatly adversely affecting crop growth. Water on slopes will run off, causing erosion. In other locations, water will remain in puddles and deposit minerals on the surface upon evaporating. Algae may build up within the system in the pumps, ponds, lines and elsewhere, causing odor and contamination. Calcium deposits may clog sprinkler outlets, valves and other components of the hydraulic circuits of irrigation systems.

In the past it has been known to treat water by a catalyst consisting of an alloy that includes copper, tin, nickel and zinc in varying proportions. This is effective in treating water to eliminate many of the problems associated with water projects. However, systems making use of such an alloy have been impractical because precipitates from the water, such as calcium carbonate, will rapidly coat the catalyst causing it to lose its effectiveness within only a brief period of time. Consequently these devices have experienced very little use.

SUMMARY OF THE INVENTION

The present invention provides a practical solution to water treatment problems with many of the benefits of water softening, sterilization and desalinization. It is a nonchemical, low-cost water treatment system which has broad applicability in virtually all water treatment systems. Maintenance is minimal and the environment is not adversely affected. Water that ordinarily would be considered contaminated and unsuitable for anything but waste now may be put to beneficial use. Far less water is required for irrigation as a result of the enhanced permeability of the soil.

Important to the arrangement of the present invention is the use of two catalysts. Water flowing through the system first passes over a primary catalyst which is of a type to lower the pH of the water to a value below 6.4. Palladium is suitable for this catalyst. The effect of the reduced pH is to assure that calcium carbonate will not precipitate out. Moreover, soluble oxygen is increased in water when it passes over such a catalyst resulting in the killing of anaerobic bacteria. This catalyst is configured to provide turbulence so that the water is thoroughly mixed and blended so that even those portions which did not directly engage the catalyst receive beneficial effects.

The system also includes a secondary catalyst made up of an alloy of copper, tin, nickel and zinc over which the water flows after leaving the primary catalyst. The secondary catalyst transforms reactive contaminants in the water into stable ions and compounds that do not adversely affect plant and animal growth. Because the water has been given a reduced pH by the primary catalyst, there will be virtually no precipitation and coating of the secondary catalyst which can continue to do its job for months on end. Consequently the unit operates satisfactorily over a long period of time without maintenance. The secondary catalyst is preferably in tubular form and includes surface roughness and grooves designed to provide turbulence and a thorough mixing of the water, together with removal of the stagnant boundary layer from the surface of the catalyst. All of the water becomes inoculated with an effective treatment and becomes of enhanced value whether or not directly in contact with the catalyst.

It is preferred to use a third catalyst, as well, which may be the same as the first catalyst, i.e., palladium. The third catalyst is downstream of the second catalyst and again reduces the pH of the water to below 6.4. Although the water was given a pH of less than 6.4 by the primary catalyst, an increase in pH will result from the action of the secondary catalyst. The reduction in pH by the third catalyst prevents precipitation of calcium carbonate in the water system downstream of the water treatment unit. This also increases the supply of soluble oxygen to combat anaerobic bacteria.

Three catalysts are arranged in a corrosion-resistant housing which is provided with a removable cover plate allowing inspection and whatever maintenance may be in order. It is not necessary to disconnect and remove the entire unit, which may be heavy and awkward to handle.

BRIEF DESCRIPTION OF THE DRAWINGS

FIG. 4 is an enlarged fragmentary perspective view of one of the segments of the secondary catalyst, as viewed from the exterior;

FIG. 5 is a view similar to FIG. 4 but illustrates the secondary catalyst segment as seen from the inside; and FIG. 6 is an enlarged perspective view of the primary catalyst separated from the remaining components of the invention.

DETAILED DESCRIPTION OF THE PREFERRED EMBODIMENT

Figure 1:
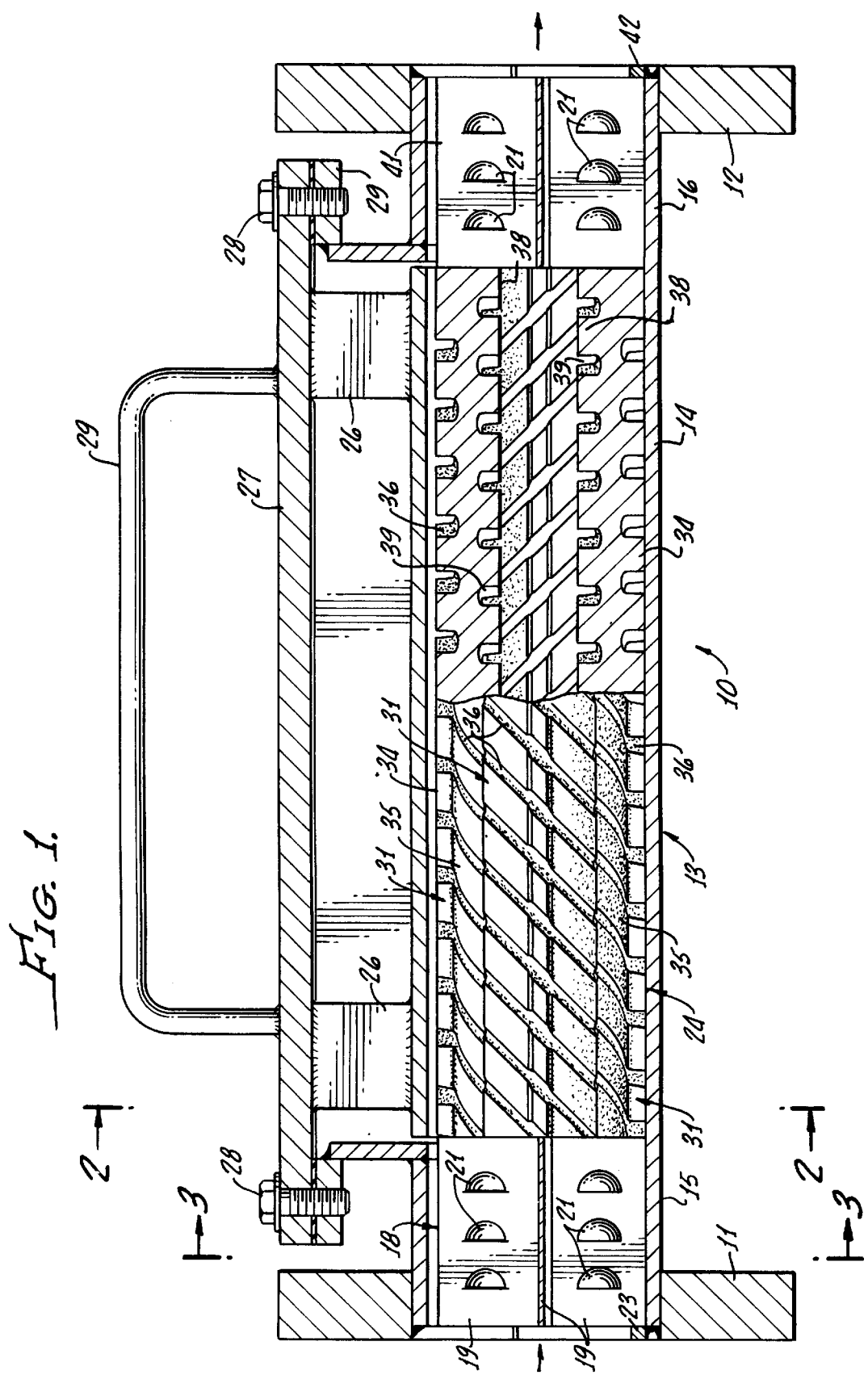
FIG. 1 is a longitudinal sectional view of the water treatment device of this invention.

The water purification device 10 illustrated is designed to fit in a line in an irrigation system, with a flange 11 provided for connection at the upstream end and a flange 12 to connect into the system at the downstream end of the unit. Water will flow through the unit 10 from one end to the other, as indicated by the arrows in FIG. 1. The flanges 11 and 12 are at the opposite ends of a housing 13, the central portion 14 of which is defined by a wall that is U-shaped in cross-section. The walls of the upstream housing portion 15 and the downstream end portion 16 are circular in cross-section. The housing 10 is of noncorrosive material, plastic for smaller units and coated metal for larger units. A resin coating is suitable.

Within the upstream end portion 15 of the housing 13 is a primary catalyst unit 18 that extends the length of the section 15. The catalyst unit 18, shown in detail in the perspective view of FIG. 6, preferably consists of eight vanes 19 having adjacent longitudinal edges from which they project radially in an equally spaced relationship. The vanes 19 extend longitudinally of the housing portion 15. The unit 18 may be constructed by joining together four V-shaped pieces 20, each defining two of the vanes 19, welding them at their apexes to form the unit. Each of the vanes 19 is provided with louvers 21, three for each vane in the example illustrated. The louvers 21 result in openings 22 through vanes 19. The louvers 21 of the two vanes 19 making up each V-shaped piece project outwardly away from each other. Therefore, in the assembly 18, the louvers 21 project toward each other from adjacent vanes 19 in four locations, and away from each other from adjacent vanes in four alternate locations. As a result, when water flows through the inlet of the housing past the catalyst unit 18, a portion of it is scooped up by the louvers 21 and directed through the openings 22, thereby causing turbulence and mixing in the water, and tending to remove the boundary layer of the water adjacent the vane surfaces. The arrangement of eight vanes also provides a large surface area for contact by the water.

The V-shaped pieces 20 of the catalyst unit 18 preferably are made of stainless steel tack-welded at their apexes at the opposite ends of the unit, after which the assembly is given a hot nickel dip. The latter assures that all of the stainless steel core is coated and protected from contact with the water. After the hot nickel dip, the unit is electroplated with palladium so as to present a palladium surface to the water flowing over it, and the palladium is firmly supported by the stainless steel core.

The palladium acts as a catalyst which lowers the pH of the water to a value below 6.4, which prevents deposition of a mineral salt coating on the secondary catalyst, which is downstream of the primary catalyst, as explained below. The size of the primary catalyst unit 18 depends not only upon the capacity of the water treatment unit 10, but also upon the pH of the water being treated. The housing section 15 may be extended and the unit 18 made longer, or two units 18 may be positioned end-to-end, if the water being treated has a high pH value, such as 8.5. This is to achieve the necessary pH reduction of the water that exits the catalyst unit 18.

A narrow lip 23 extends partway around the entrance to the housing 10 at the flange 11 adjacent one end of the catalyst unit 18. This retains the catalyst 18 within the housing.

Figure 2:
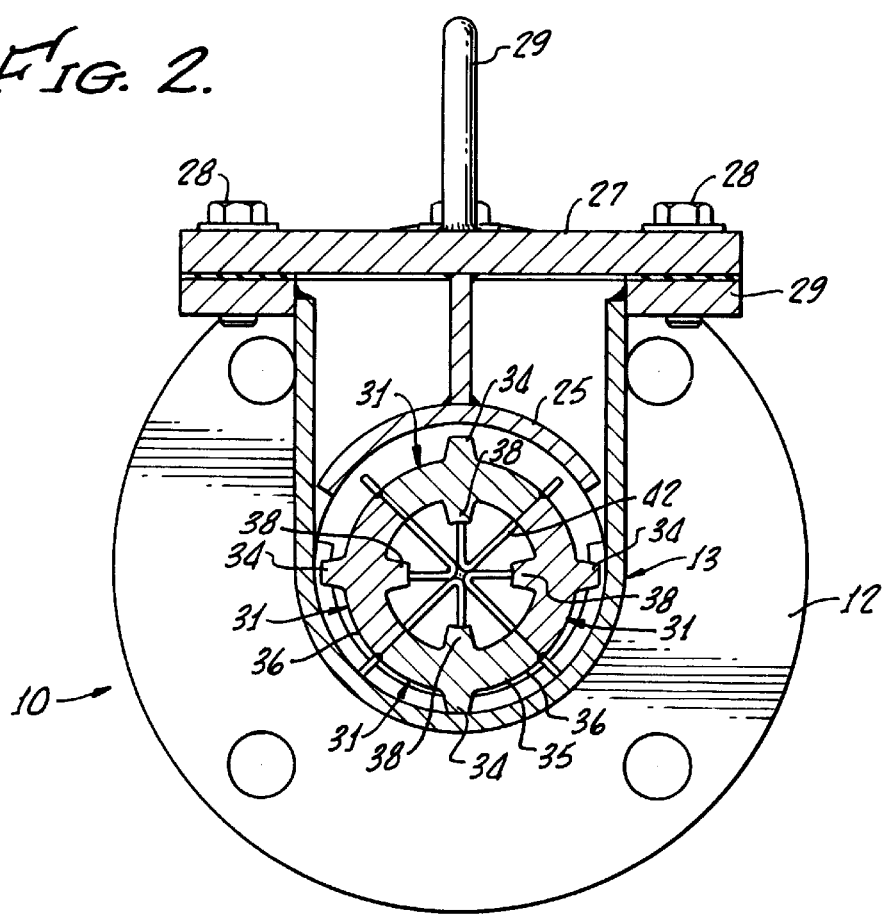
FIG. 2 is a transverse sectional view taken along line 2—2 of FIG. 1.
Figure 3:
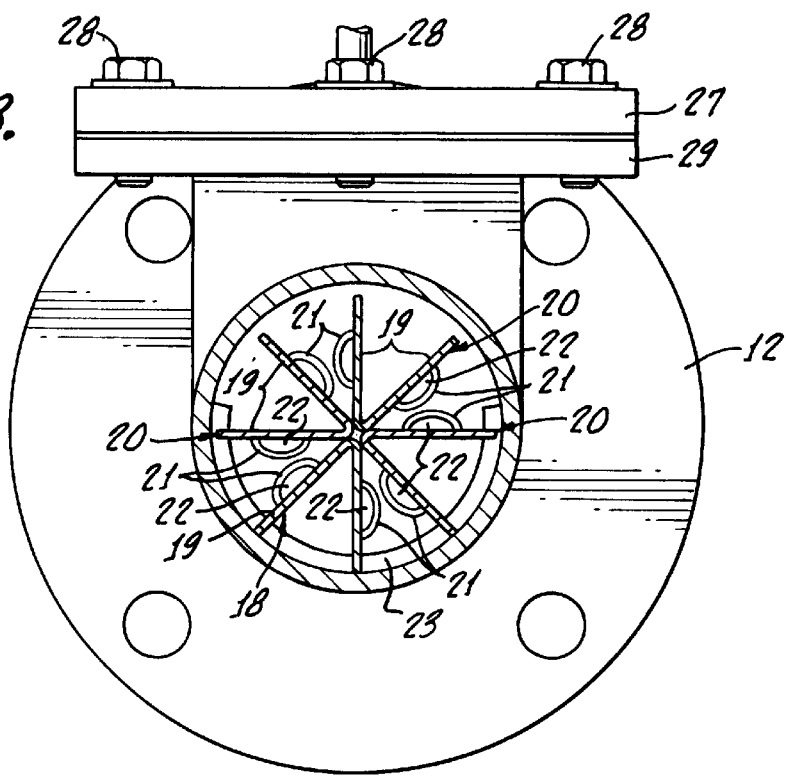
FIG. 3 is a transverse sectional view taken along line 3—3 of FIG. 1.

The secondary catalyst unit 24 in the central portion 14 of the housing 13 is relatively thick walled and tubular in configuration. The lower portion of the secondary catalyst unit 24 fits generally complementary in the lower portion of the housing section 14, as best seen in the cross-section of FIG. 2. The catalyst unit 24 is held in place vertically by an arcuate plate 25 that runs longitudinally of the housing section 14 and is generally complementary to the exterior of the catalyst unit 24. The arcuate plate 25 is suspended by a pair of ribs 26 at its opposite end portions from a cover plate 27 that is held by screws 28 to a flange 29 around the upper edge of the central housing portion 14. The cover plate 27 is readily removable and provided with a handle 29 to allow access to the central portion 14 of the housing 13. This facilitates inspection and maintenance so that it is not necessary to remove the entire unit for such purpose. The arcuate plate 25 cooperates with the lower portion of the U-shaped central part 13 of the housing to confine the flowing water in a tubular channel around the catalyst 24.

The secondary catalyst assembly 24 preferably is made up of four sections 31, each of which is a casting of an alloy of copper, tin, nickel and zinc. A suitable alloy has the following percentages by weight:

| | |
|---|---|
| copper | 37.070% |
| tin | 14.140% |
| nickel | 23.820% |
| zinc | 24.920% |
| iron | 0.010% |
| aluminum | <0.010% |
| silicon | 0.010% |
| manganese | <0.010% |
| antimony | 0.020% |
| sulfur | <0.010% |
| phosphorus | <0.010% |

The sections 31 are welded together at the ends of their longitudinal edges 32 and 33 and collectively define the tubular configuration of the unit. These sections are made to have rough exterior surfaces accomplished by making them as sand castings within molds formed from coarse sand relatively loosely packed. The roughness of the surfaces increases the area of the catalyst in contact with the water and helps create turbulence.

Each of the catalyst sections 31 includes a radially projecting longitudinal exterior rib 34 which projects from an arcuate part 35. The rib 34 is interrupted by a series of equally spaced grooves 36 which extend through the rib 34 and into the exterior surface of the arcuate part 35. The grooves 36 are inclined and generally mate with the grooves 36 of adjoining units 31. Each of the sections 31 includes the entrance to two of the grooves 36 so that there are in effect eight continuous grooves spiraling down the exterior of the unit 24 from its upstream end to its downstream end. The twist of the spiral of the grooves 36 is in a counterclockwise direction from the inlet end toward the outlet end.

In a similar manner, each of the sections 31 includes an internal longitudinal rib 38 interrupted by grooves 39 that extend through the rib 38 and into the inner surface of the arcuate portion 35. Each of the sections 31 includes one of the interior grooves 39 which again spiral in a counterclockwise direction.

The counterclockwise spiral of the grooves 36 and 39 counters the natural tendency of the water to rotate in a clockwise direction to increase turbulence.

The outlet end of the housing 14 is similar to the inlet end 15. It is a primary catalyst unit 41, which may be identical to the unit 18. It is held against displacement longitudinally from the housing 10 by means of a narrow lip 42 which extends a little more than halfway around the exit opening and is engaged by the vanes of the unit 41. The purpose of the unit 41 is to lower the pH of the water which becomes raised through the catalytic reaction by the secondary catalyst 23.

The three catalysts 18, 22 and 41 are in an end-to-end abutting relationship to avoid any reactions in the unit other than the desired catalytic reactions.

The unit 10 illustrated is especially designed for treatment of water used for irrigation for agricultural purposes. The water will be pumped through the unit prior to its distribution in the fields. Within the unit 10, the pH of the water initially is reduced to a value below 6.4 by the action of the primary catalyst 18, as described above. At the reduced pH, calcareous salts, which typically are present in high concentrations in irrigation water, will not precipitate out of the water. Consequently, calcium carbonate or magnesium carbonate will not coat the secondary catalyst 24, which remains clean for doing its job of transforming reactive contaminates into stable ions and compounds. Without the primary catalyst 18, the secondary catalyst would become coated within a short time and its functioning shut down. The primary catalyst 18 also increases the soluble oxygen in the water which causes anaerobic bacteria to be killed. These bacteria cannot survive in the presence of the increased oxygen supply in the water resulting from the primary catalyst 18.

The configuration of the primary catalyst 18 also creates a turbulent blending of the water at the boundary layer with the catalyst unit with the water that does not come into engagement with the unit. As a result, all of the water passing through the unit is treated even though only a small portion of it may have had direct engagement with the catalyst.

The secondary catalyst 24 receives the turbulently flowing water from the primary catalyst 18, causing further turbulence and mixing by the arrangement of ribs, grooves and the roughness of the surface of this unit. The stagnant boundary layer next to the surface of the catalyst 24 is continually stripped away to be replaced by previously untreated water. This allows an exchange of ions to occur so that the water passing over the unit is effectively treated. The alloy of the secondary catalyst 24 reduces the salinity and hardness of the water. The sodium chloride present in the water becomes transformed to calcium chloride, sodium hydroxide and sodium bicarbonate, all benign forms which have no adverse effect on plant growth. Calcium carbonate in the water changes to sodium carbonate and provides extra soluble oxygen in the water. Nitrates and nitrites are reduced. Harmful compounds are negated and the extra oxygen is formed which destroys anaerobic bacteria.

The unit 10 of this invention has been found to have a variety of beneficial effects. Soil becomes more friable and the water penetrates more deeply. Crop growth is stimulated and plant quality is enhanced materially. Water penetrates the soil even on slopes and puddling on the surface and salt deposits are avoided. Water is conserved as effective irrigation is accomplished with only a fraction of the volume of water previously necessary. Moreover, the irrigation system, including pipes and sprinkler heads, becomes cleaned with scale being removed. In addition, the water treatment interrupts the food chain of simple aquatic plants and animals by complexing their nutrients so that algae and anaerobic bacteria, which may be present in holding ponds, reservoirs or other portions of an irrigation system, are removed. Water becomes clarified. The need for wetting agents and other chemical additives is eliminated.

In treating water for other purposes, the water treatment devices of this invention are similar to that of the unit 10, differing primarily in proportions. In some instances, the water is not pumped through the system but is caused to flow by other means. For example, in treating the water of a lake or pond for algae removal, units may be fastened beneath a pontoon boat, with water being forced through the units by the velocity of the boat through the water. In other instances, gravity may produce the flow of water.

The invention is beneficial for treating water for a broad range of purposes. Commercially, the treated water is beneficial for cooling towers, refrigeration systems, ventilation systems, and many others where descaling and algae control are needed. Swimming pools may be kept in condition without the addition of chemicals. Gray water and even brackish water may be used safely for irrigation. Soil that has become compacted and contaminated can be made more permeable and reclaimed. Salts and mineral contaminants in the soil are negated and the binders in compacted soil are decalcified. Water for firefighting will more quickly smother the fire and penetrate burning materials. These are only a few examples of the beneficial effects of systems utilizing the invention.

The foregoing detailed description is to be clearly understood as given by way of illustration and example only, the spirit and scope of this invention being limited solely by the appended claims.

What is claimed is:

1. A device for treating water comprising:
   a housing having an inlet end and outlet end;
   a first palladium catalyst in said housing adjacent said inlet end adapted to lower the pH of water entering said housing to a value below substantially 6.4; and
   a second catalyst in said housing downstream of said first catalyst, said second catalyst comprising an alloy of copper, tin, nickel and zinc.

2. A device as recited in claim 1 in which said alloy of said catalyst includes substantially the following percentages by weight:

| | |
|---|---|
| copper | 37.07% |
| tin | 14.14% |
| nickel | 23.82% |
| zinc | 24.92%. |

3. A device as recited in claim 1 in which said second catalyst is in tubular configuration and includes a plurality of surface grooves arranged in a counterclockwise pattern from the inlet end through the outlet end of said catalyst.

4. A device as recited in claim 1 in which said second catalyst is made up of a plurality of arcuate sections having longitudinal edges in juxtaposition so as to define a tubular shape.

5. A device as recited in claim 4 in which each of said sections includes a longitudinal exterior rib and a longitudinal interior rib, at least one exterior groove extending through said exterior rib and into the exterior surface thereof, and at least one interior groove extending through said interior rib and into the interior surface thereof.

6. A device as recited in claim 1 in which said housing includes a removable cover plate for providing lateral access to the interior of said housing.

7. A device as recited in claim 1 including, in addition, an arcuate plate positioned adjacent said second catalyst for defining a portion of the chamber within said housing at the location of said second catalyst.

8. A device as recited in claim 1 in which said housing includes a section substantially U-shaped in cross-section, said second catalyst being positioned within said section of said housing, and including a removable arcuate plate for cooperating with said U-shaped portion of said housing for defining a generally tubular passageway receiving said second catalyst.

9. A device as recited in claim 1 in which said first catalyst includes a support, and a coating of palladium electroplated on said support.

10. A device as recited in claim 9, in which said support is stainless steel.

11. A device as recited in claim 1 in which said first catalyst includes a plurality of vanes positioned longitudinally in said housing.

12. A device as recited in claim 11 in which each of said vanes has a longitudinal edge in juxtaposition with a corresponding edge of the other vanes, said vanes thereby forming an assembly with said vanes projecting radially in a spaced relationship from said longitudinal edges.

13. A device as recited in claim 12 in which said vanes are provided with louvers thereon for creating turbulence in water passing over said vanes.

14. A device as recited in claim 13 in which said louvers provide scoops to direct water from one side of said vanes to the other.

15. A device as recited in claim 14 in which said louvers project toward each other from alternately positioned adjacent vanes and away from each other from intermediate adjacent vanes.

16. A device as recited in claim 11 in which said vanes include a stainless steel support, a nickel coating on said support and palladium over said nickel.

17. A device as recited in claim 16 in which said palladium is electroplated on said nickel coating.

18. A device as recited in claim 1 including in addition a third catalyst in said housing downstream of said second catalyst, said third catalyst being of a type for reducing the pH of water flowing through it.

19. A device as recited in claim 18 in which said third catalyst is palladium.

20. A method for treating water comprising the steps of passing said water over a first palladium catalyst such as to reduce the pH of said water to below 6.4, and then passing said water over a second catalyst comprising an alloy of copper, tin, nickel and zinc.

21. The method as recited in claim 20 including additionally passing said water over a third catalyst, after so passing said water over said second catalyst, said third catalyst being of the type for lowering the pH of the water.

22. The method as recited in claim 21 in which said third catalyst is of the type for lowering the pH of the water to below substantially 6.4.

23. The method as recited in claim 22 in which said third catalyst is palladium.

* * * * *